James D Sarven.

Carriage Wheel.

No. 3079.

Reissued Aug. 11. 1868

UNITED STATES PATENT OFFICE.

JAMES D. SARVEN, OF COLUMBIA, TENNESSEE.

IMPROVED CARRIAGE-WHEEL.

*Specification forming part of Letters Patent No.* 17,520, *dated June* 9, 1857; *reissue No.* 3,079, *dated August* 11, 1868.

*To all whom it may concern:*

Be it known that I, JAMES D. SARVEN, of Columbia, in the county of Maury and State of Tennessee, have invented a new Improvement in Carriage-Wheels; and I do hereby declare the following, when taken in connection with the accompanying drawings and the letters of reference marked thereon, to be a full, clear, and exact description of the same, and which said drawings constitute part of this specification, and represent, in—

Figure 1:
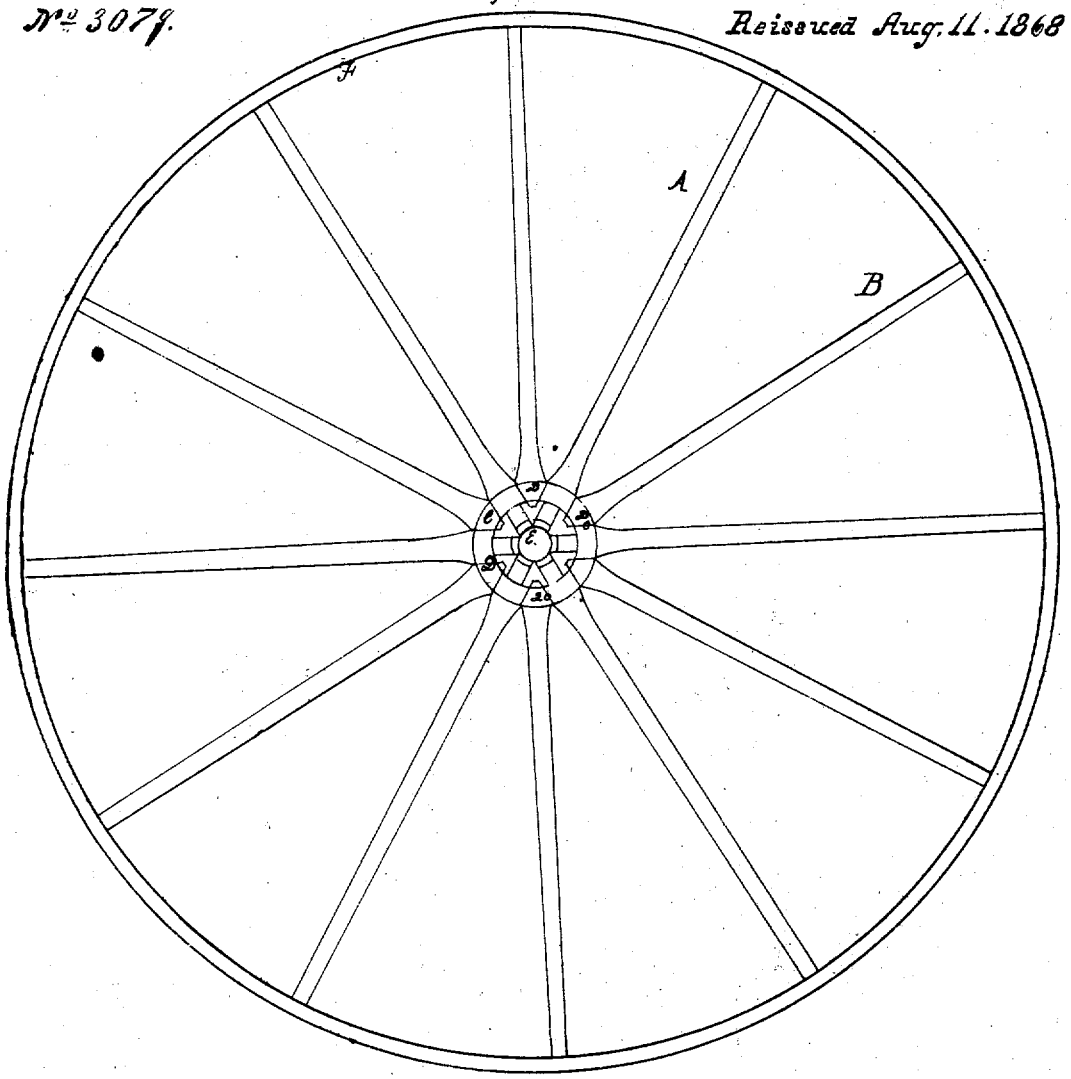
Figure 2:
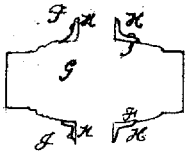
Figure 4:
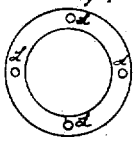
Figure 3:
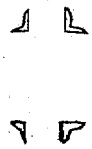

Figure 1, a front view of a wheel with the front part of the hub removed to show a section at the spokes; Fig. 2, a side view of the hub to show a section of the flanges; Fig. 3, a sectional view of the flanges detached; and in Fig. 4, an inside view of one of the flanges.

This invention relates to an improvement in wheels for vehicles of various descriptions, which are termed "carriage-wheels," the object being to construct a wheel with a bearing surface or support between the spokes near the hub, whereby the wheel is greatly strengthened; also, to provide a wooden hub and spokes with an additional support at the hub.

To this end my invention consists, first, in the arrangement of the spokes at the hub so that a bearing-surface between each spoke and the next is obtained, thereby forming a solid band around the hub; second, in combining with a wooden hub a metallic band or flange surrounding the hub and bearing against the spokes, so as to support the hub and the spokes at and near to the hub.

In order to the clear understanding of my invention, I will fully describe the same as illustrated in the accompanying drawings.

It is needless to describe the ordinary method of inserting the spokes. I will only call attention to the fact that in the common arrangement, the spokes being mortised into the hub, they must necessarily be at a distance from each other at the hub to give a sufficient amount of material between the mortises to sustain the spokes in the hub.

In the drawings I illustrate one arrangement of my invention, in which alternate spokes A, as in Fig. 1, are constructed with a tenon fitted into a mortise in the hub. At the hub, and a short distance therefrom, the surfaces of the spokes upon the sides are formed flat, and between the spokes A other spokes, B, are fitted, so that the surface of all the spokes meet a short distance from the hub, as denoted in Fig. 1, and so as to form a bearing-surface or solid belt of wood entirely around the hub. I form a slight recess in the hub, between the mortises of the spokes A, sufficient to retain the spokes B in their place. The spokes B are fitted and driven between the spokes A, and all the spokes united solidly together. By this means a bearing may be formed much greater than the usual diameter of the hub, and a greater number of spokes inserted, whereby the wheel is greatly sustained against the ordinary strain, and the felly also sustained by an increased number of spokes; or the same object may be accomplished by forming a small tenon upon each and every spoke and corresponding mortises made in the hub, and the spokes fitted so as to have a bearing against each other, in like manner as I have described.

As a further support for the spokes, I construct bands or flanges J and H, which are fitted to pass on over the hub—one upon the rear and the other upon the front—so as to bear up against the face of the spokes upon both sides, and the two bands or flanges connected together by bolts passing through or between the spokes, or by other suitable device; and these flanges may be placed upon the hub before or after the spokes are inserted. I prefer, however, (as a matter of convenience,) to first fit the spokes, and then place the flanges over the hub against the spokes. These flanges extend up onto the face of the spokes, so as to form a bearing for the spokes above the tenons, and thereby greatly relieve the strain upon the tenons of the spokes and the mortises of the hub.

A single plate upon the outside of the spokes will, to a certain extent, accomplish the object, but not so fully and perfectly as the plates upon opposite sides, as, where two plates or flanges are used and the two connected together, the strain is taken almost entirely from the tenon and the wooden portion of the hub; and to fully accomplish the object of the invention it is essential that the two plates be connected in some manner between the spokes, so as to form, as it were, a single metallic band around the hub, through which the spokes pass.

I do not wish to be understood as confining the metallic band or flanges to any particular arrangement of spokes, as it is alike applicable to other arrangements of spokes, where the flange can have a bearing-surface upon the face of the spoke.

Having fully described my invention, what I claim as new and useful, and desire to secure by Letters Patent, is—

1. A carriage-wheel constructed with a wooden hub, in which the spokes are arranged at the said hub, so as to have a bearing-surface or support between each other, so as to form a continuous body or band around the said hub, substantially in the manner and for the purpose set forth.

2. A carriage-wheel in which the hub is constructed by combining a wood center and a metallic band or bands, flange or flanges, arranged so that the said metallic band or flange forms an additional bearing or support for the spokes when the bands or flanges upon the opposite sides of the spoke are connected together through or between the spokes, to unite the two flanges and form, as it were, one metallic band, through which the spokes pass.

JAMES D. SARVEN.

Witnesses:

A. J. TIBBITS,

J. H. SHUMWAY.